(12) United States Patent
Fisher

(10) Patent No.: US 7,894,304 B2
(45) Date of Patent: Feb. 22, 2011

(54) PROJECT CALCULATOR WITH INTEGRAL DISTANCE MEASUREMENT SENSOR

(75) Inventor: Gary A. Fisher, Hong Kong (CN)

(73) Assignee: OneWorld Solutions Limited, Hong Kong (HK)

( * ) Notice: Subject to any disclaimer, the term of this patent is extended or adjusted under 35 U.S.C. 154(b) by 322 days.

(21) Appl. No.: 12/163,985

(22) Filed: Jun. 27, 2008

(65) Prior Publication Data

US 2009/0018796 A1    Jan. 15, 2009

Related U.S. Application Data

(60) Provisional application No. 60/937,747, filed on Jun. 29, 2007.

(51) Int. Cl.
*G01S 15/08* (2006.01)
*G01C 3/08* (2006.01)

(52) U.S. Cl. .................. 367/99; 356/4.01; 367/910

(58) Field of Classification Search .............. 367/99, 367/910; 356/4.01
See application file for complete search history.

(56) References Cited

U.S. PATENT DOCUMENTS

| | | | | |
|---|---|---|---|---|
| 4,730,190 A | * | 3/1988 | Win et al. ................ | 342/118 |
| 5,256,908 A | * | 10/1993 | Averbuch et al. ........... | 367/99 |
| 6,373,579 B1 | * | 4/2002 | Ober et al. ................ | 356/627 |
| 6,704,097 B2 | * | 3/2004 | Waibel et al. ............. | 356/4.01 |
| 6,721,623 B1 | | 4/2004 | Diamond et al. | |
| 6,813,585 B2 | * | 11/2004 | Leutz et al. .............. | 702/158 |
| 7,006,405 B1 | * | 2/2006 | Huang .................... | 367/107 |
| 7,230,683 B2 | * | 6/2007 | Stierle et al. ............. | 356/4.01 |
| 7,456,936 B2 | * | 11/2008 | Gogolla et al. ........... | 356/4.01 |
| 7,639,346 B2 | * | 12/2009 | Booker, Jr. ............... | 356/5.02 |

\* cited by examiner

*Primary Examiner*—Ian J Lobo
(74) *Attorney, Agent, or Firm*—Edwards Angell Palmer & Dodge LLP

(57) ABSTRACT

A project calculator, including a housing, a circuit board mounted within the housing and including a processor, an input device connected to the circuit board and interfacing with the processor, an output device connected to the circuit board and interfacing with the processor, and a distance sensor rotatably mounted to the housing and interfacing with the processor. A laser assembly is may also be rotatably mounted to the housing and configured to provide a visual indicator to an object to which the distance sensor is pointing. One or more level indicators may also be mounted to the housing.

7 Claims, 4 Drawing Sheets

PROJECT CALCULATOR WITH INTEGRAL DISTANCE MEASUREMENT SENSOR

CROSS REFERENCE TO RELATED APPLICATION

This application claims priority to U.S. Provisional Patent Application No. 60/937,747, filed Jun. 29, 2007, which is incorporated herein by reference in its entirety.

BACKGROUND OF THE INVENTION

1. Field of the Invention

The present invention relates generally to electronic calculators and more specifically to a project calculator having an integral distance measurement sensor for calculating various materials needed in the building trade, for home improvement projects, and/or for quantity surveying.

2. Description of the Related Art

Calculators are well known in the art. Typically, a calculator is comprised of a keyboard and/or keypad, a liquid crystal display (LCD), a printed circuit board (PCB) containing a microprocessor that performs calculations, and a power source supplying energy to the other components. The calculations are performed using algorithms derived from standard arithmetic formulas. Recently, the complexity of calculators, as well as the number of applications available for calculators has increased dramatically, with more calculators appearing that are designed for specific trades or job functions. For example, U.S. Pat. No. 6,721,623 discloses a woodworking and home improvement calculator that uses individual keys to select a building material type and requires a user to enter the values needed for the calculation.

One problem with conventional home improvement calculators is that they tend to be large and complex. Another problem with conventional home improvement calculators is that they use individual keys to select the building material, which limits the functionality of the calculator. For every new building material, a new unique key is required. This approach limits the building materials that can be selected on the calculator, since there is a physical limit to the number of buttons that can be included on the calculator before the design becomes impractical.

Another problem with conventional home improvement calculators is the inability to receive data input from integrated sensors that can measure distance. As a result, a user of a conventional home improvement calculator still has to physically measure the distances involved using, for example, a conventional tape measure. There is a need for a project calculator capable of overcoming the above-mentioned problems.

SUMMARY OF THE INVENTION

In view of the foregoing disadvantages inherent in the known types of calculators, the present disclosure provides a new project calculator having an integral distance measurement sensor. The present invention substantially departs from the conventional concepts and designs of the prior art, and in so doing provides an apparatus primarily developed for the purpose of calculating building material quantities. The calculator also includes spirit levels to ensure that the unit is accurately positioned, a laser which indicates the point to which the integral distance sensor is measuring, a digital display which prompts a user for the next input value, and a simplified keyboard/keypad for ease of use. Material choice is selected from a scroll though screen menu and therefore each material does not require a dedicated key, thus allowing for expansion of functionality simply by updating the software.

The general purpose of the present invention, which will be described subsequently in greater detail, is to provide a new project calculator with an integral distance measurement sensor that has many of the advantages of the conventional home improvement calculator as well as many novel features, resulting in a new project calculator which is not anticipated or rendered obvious, suggested, or even implied by any of the prior art calculators, either alone or in combination.

In one exemplary embodiment, the project calculator includes a housing, a circuit board mounted within the housing and including a processor, an input device connected to the circuit board and interfacing with the processor, an output device connected to the circuit board and interfacing with the processor, and a distance sensor rotatably mounted to the housing and interfacing with the processor.

In another exemplary embodiment, the project calculator includes a housing, a circuit board mounted within the housing and including a processor, a keypad connected to the circuit board and interfacing with the processor, a display device connected to the circuit board and interfacing with the processor, and a casing rotatably mounted to the housing. A distance sensor is mounted within the casing and interfaces with the processor. The distance sensor is configured to measure a distance from the sensor to an object. A laser assembly is also mounted within the casing and is configured to provide a visual indicator on the object to which the distance sensor is pointing. A level indicator is mounted to the housing, and a power source connected to the circuit board provides power to components of the project calculator.

In another exemplary embodiment, the project calculator includes a housing, a printed circuit board mounted within the housing and including a memory device and a processor, a keypad connected to the circuit board and interfacing with the processor, and a display device connected to the circuit board and interfacing with the processor. A casing is rotatably mounted to the housing, and an acoustic proximity sensor is mounted within the casing. The acoustic proximity sensor interfaces with the processor and is configured to measure a distance from the sensor to an object. A laser assembly is also mounted within the casing and is configured to provide a visual indicator on the object. A plurality of level indicators are mounted to the housing to provide an indication of whether the housing is level with respect to at least two different reference axes, and a power source connected to the circuit board provides electrical power to the components of the project calculator. The project calculator is configured to function in at least three modes, including a project calculator only mode, a project calculator with integral sensor measurement mode, and a measure only mode.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a project calculator with integral distance measurement sensor that will overcome the shortcomings of the prior art devices.

An object of the present invention is to provide a project calculator with an integral distance measurement sensor for the calculation of distances using any suitable unit of measure, including feet/meters/inches/centimeters and increments thereof.

Another object of the present invention is to provide a project calculator with an integral distance measurement sensor for the calculation of a multitude of standard building material quantities, and differing calculations dealing with, but not limited to, the following building materials: block, board feet, brick, carpet, concrete, deck, fence, gravel, mulch, paint, roof bundles, stud, tile, wallpaper and 4'×8' sheet.

Another object of the present invention is to provide the ability to alter the system default values in the calculations for the various building materials, for example the paint coverage per gallon, thus allowing the user to adjust for differing material characteristics. This is achieved via the keyboard/keypad and display menu.

Another object of the present invention is to provide project costs and material costs calculations associated with these building materials.

Another object of the present invention is to provide helpful prompts to guide the user through the various operations and options. Prompts are scrolled on the display and also indicate the current input expected from the user via the keypad.

Another object of the present invention is to provide a laser designator that allows the user to accurately determine to which point the integral distance sensor is measuring.

Another object of the present invention is to provide spirit levels to allow the user to accurately ensure that the unit is level, thus increasing the accuracy of any measurement and calculation.

Another object of the present invention is to provide expandability of the functionality of the calculations and options by upgrading software as needed since functions are selected by scrolled prompts on the LCD display, thus eliminating the need for dedicated keys on the keyboard/keypad.

To accomplish the above and related objects, the invention may be embodied in the form illustrated in the accompanying drawings. However, the drawings are illustrative only; changes may be made to the specific construction illustrated without departing from the scope of the invention.

BRIEF DESCRIPTION OF THE DRAWINGS

Various other objects, features and attendant advantages of the present invention will become fully appreciated and better understood when considered in conjunction with the accompanying drawings, in which like reference characters designate like parts throughout the several views, and wherein.

DETAILED DESCRIPTION OF THE INVENTION

Figure 1:
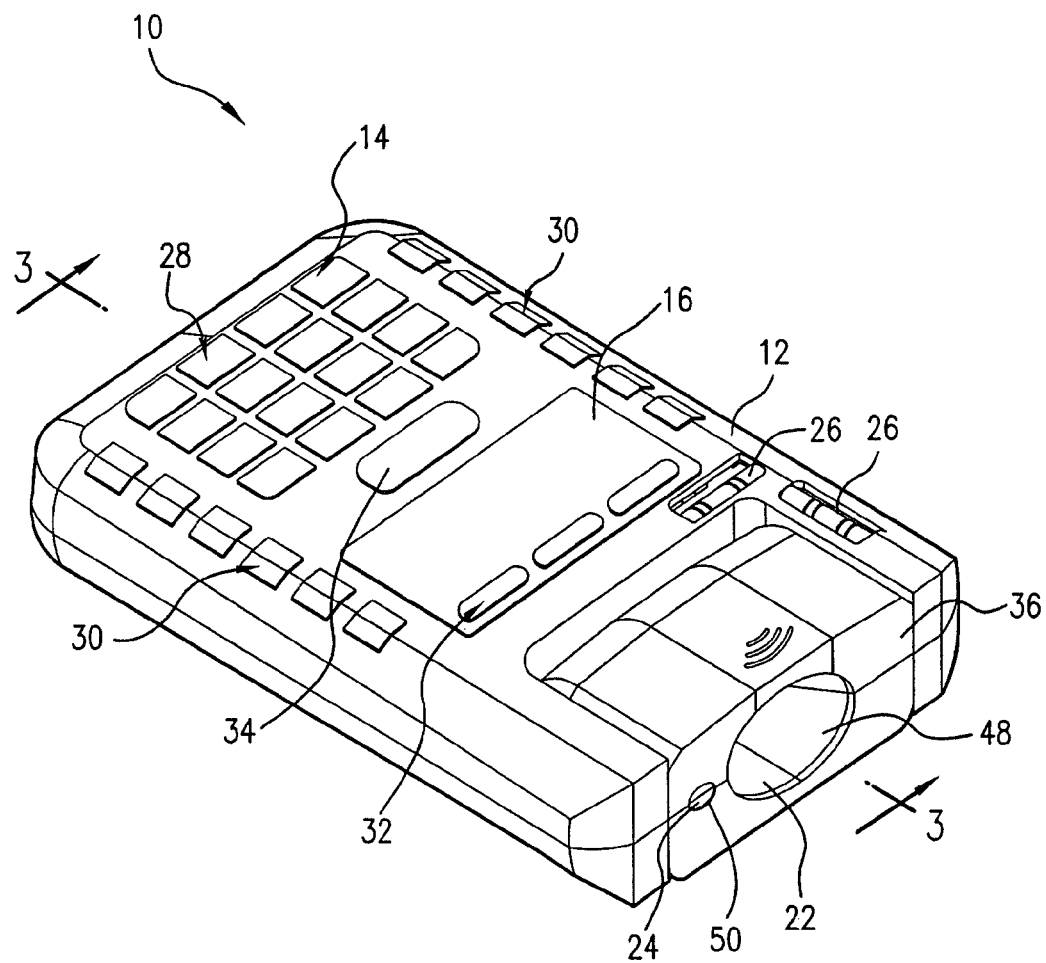
FIG. 1 is a perspective view of an exemplary embodiment of the project calculator, showing the keypad, display, integral distance sensor, housing, spirit levels, and laser assembly.

For purpose of explanation and illustration, but not limitation, a perspective view of an exemplary embodiment of a project calculator having an integral distance measurement sensor, in accordance with the invention, is shown in FIG. 1 and is designated generally by reference character 10. Other aspects of the project calculator are provided in FIGS. 2 through 4, as will be described.

Calculator 10 includes a housing 12, with a keyboard/keypad 14 and a display 16 mounted in housing 12. Keypad 12 and display 16 interface with one or more circuit boards 18 mounted on an interior portion of housing 12. A power source 20 connected to circuit board 18 is incorporated into housing 12. Calculator 10 also includes an integral distance sensor 22, a laser 24, and one or more spirit levels 26 mounted to housing 12.

Housing 12 provides protection for the electronics and other components of calculator 10, and can be constructed from various materials such as plastic, metal, and rubber. In one exemplary embodiment, housing 12 is formed from injection-molded plastic. It should be understood that housing 12 may be made from any suitable material, and may or may not be ruggedized and/or water proof.

Keypad 14 allows a user to access the functions of calculator 10, to input data, and select various menu options presented to the user. In one exemplary embodiment, keypad 12 is a rubber membrane type keyboard. As shown in FIG. 1, keypad 12 may include several distinct key groups, each area including one or more keys. In the exemplary embodiment shown in FIG. 1, keypad 12 includes a main key group 28, two side key groups 30, a display key group 32, and a central key 34. In the exemplary embodiment shown in FIG. 1, display key group 32 includes three buttons that protrude from apertures in display 16. Side key groups 30 include a plurality of keys lined up in a vertical manner, and main key group 28 includes a plurality of keys laid out in a traditional configuration. Each key on keypad 12 can be programmed to perform one or more functions. Alternatively, keypad 12 may be integrated into display 16 as a touch-sensitive screen. Calculator 10 may also incorporate a combination of a physical keyboard and a touch-sensitive screen.

Display 16 displays the results from calculations as well as system messages to the user including prompts indicating the next expected input type and value. In one exemplary embodiment, central key 34 is used to scroll through and select menu items on displayed to a user on display 16. Display 16 may be a liquid crystal display (LCD), or any other suitable display type. For example, display 16 may include a light emitting diode (LED) display. Additionally, output from calculator 10 may be presented in any number of audio and/or visual formats. Output messages and instructions could be in the form of audio/visual prompts and could include audio and voice indications.

Integral distance sensor 22 provides accurate measurement of the distance from the tip of sensor 22 to an object or surface. In one exemplary embodiment, distance sensor 22 is an acoustic proximity sensor. In this embodiment, sensor 22 emits ultrasonic pulses that reflect off the object or surface that is being measured and return to the sensor. The delay between the transmitted and received pulses is timed, and the distance to the object or surface is determined from the delay.

Alternatively, integral distance sensor 22 may be any suitable sensor using sonic, ultrasonic, laser, radar, or any other distance measuring technique. Integral in this context means integral to the function of the calculator 10. The use of an external sensor not physically connected to housing 12, but remote and electrically connected by wire/wireless to the housing is an implied variation of the embodiment.

Figure 2:
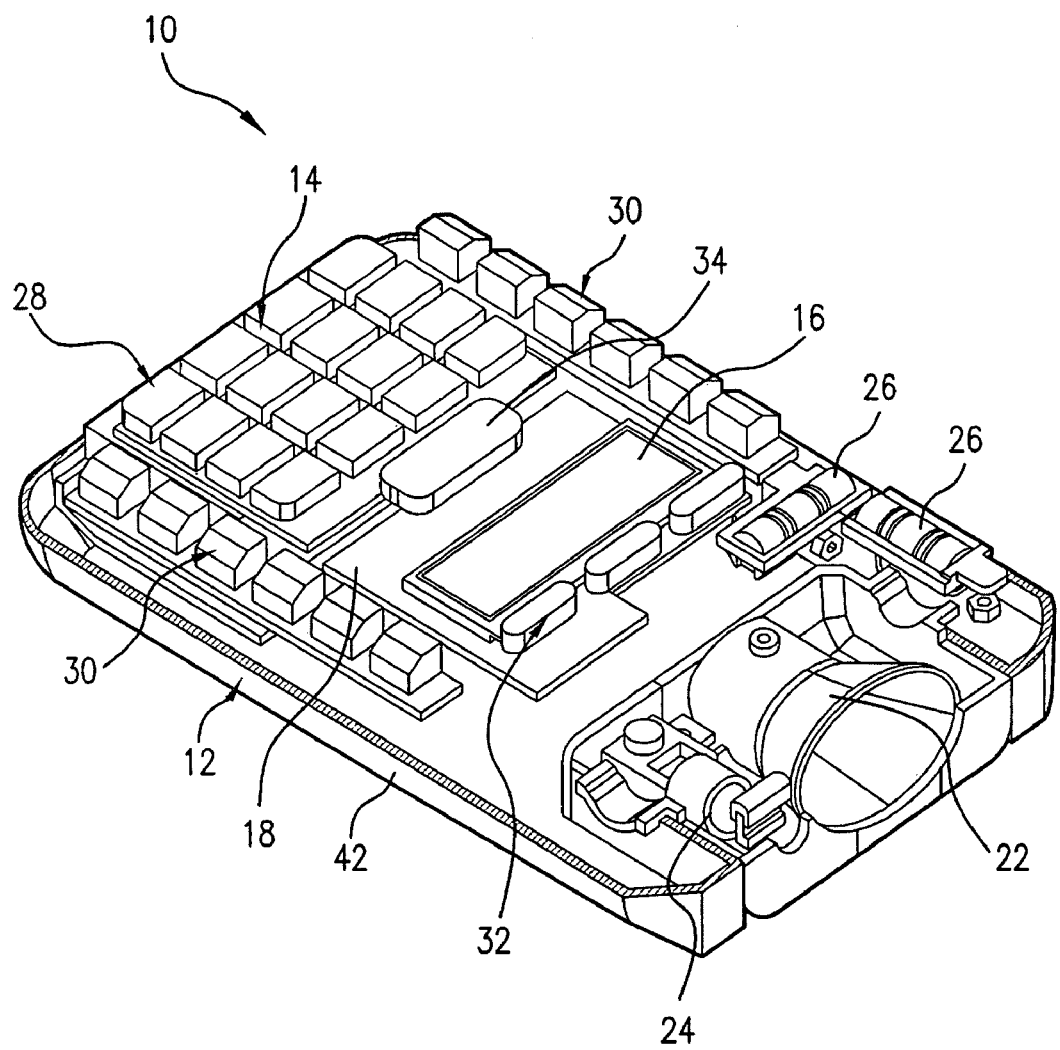
FIG. 2 is a perspective view of the project calculator with a front portion of the housing removed, showing the keypad, display, integral distance sensor, circuit board, back portion of the housing, spirit levels, and laser assembly.
Figure 3:
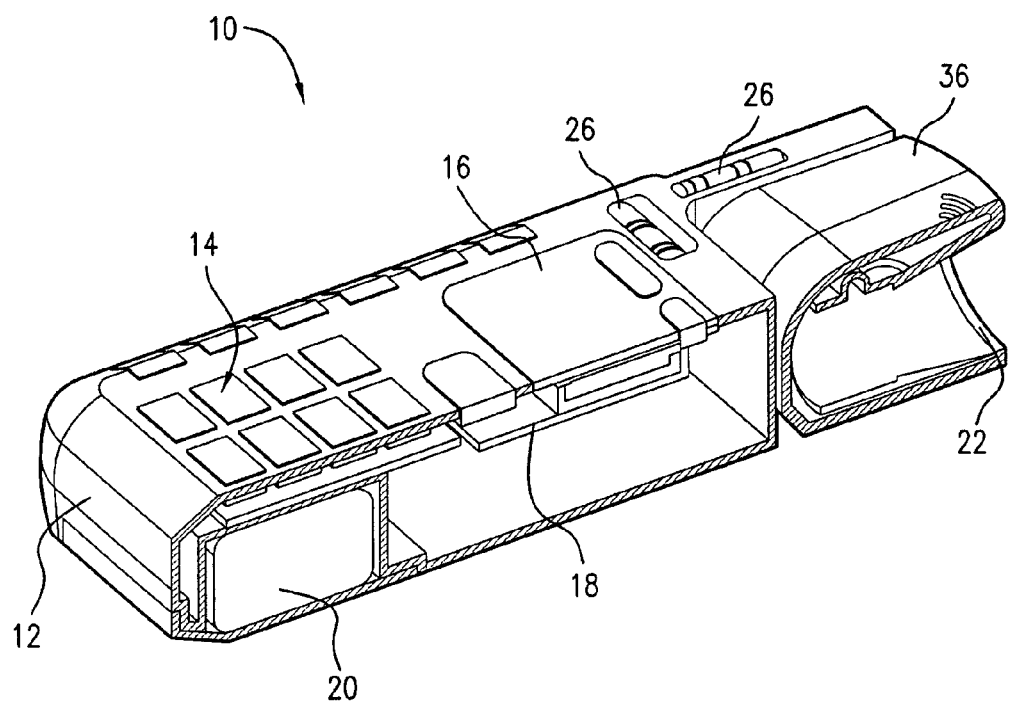
FIG. 3 is a cut-away perspective view of the project calculator, the project calculator being cut away along line 3-3 of FIG. 1, and showing the housing, keypad, display, integral distance sensor, circuit board, power source, spirit levels, and laser assembly.
Figure 4:
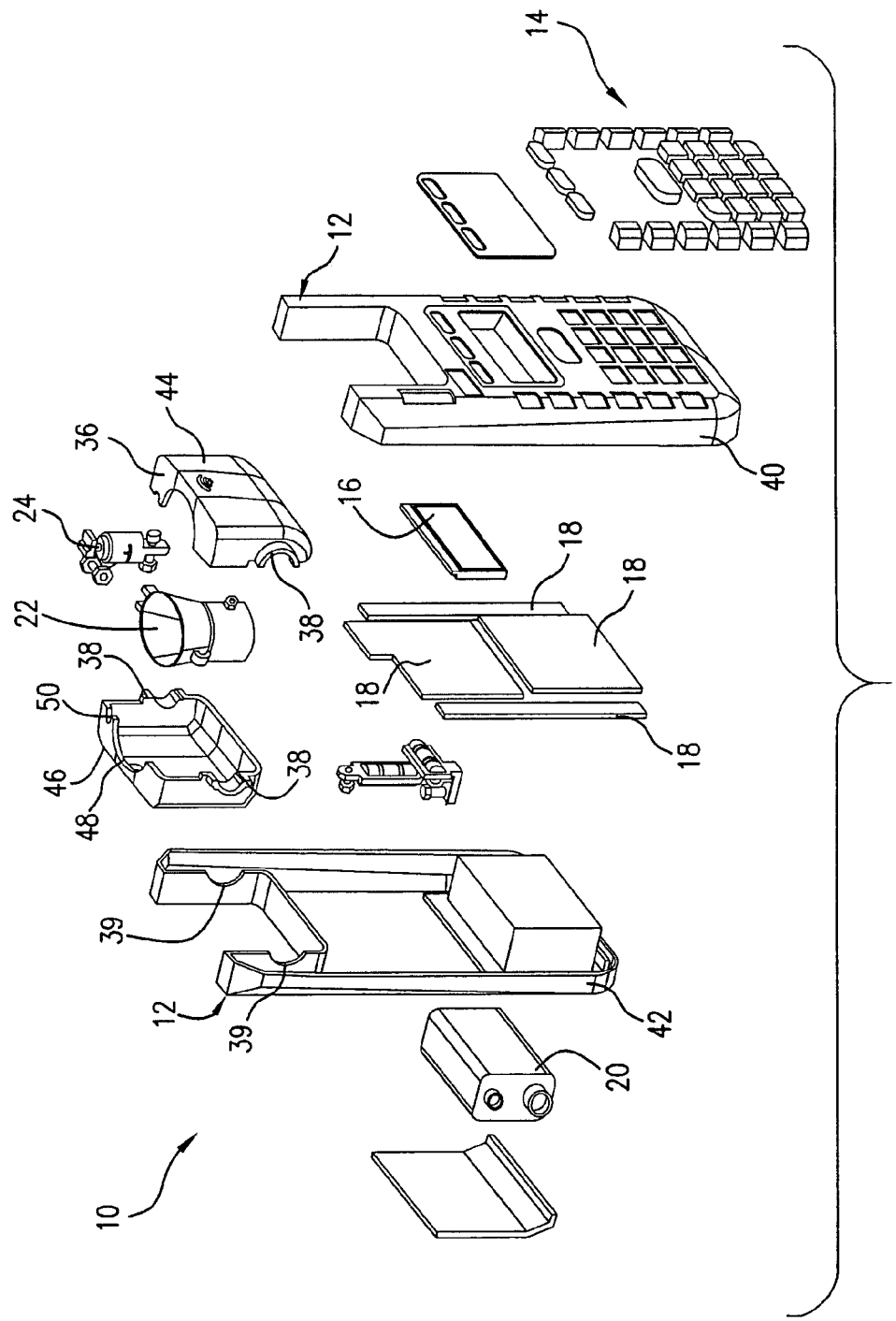
FIG. 4 is an exploded view of the calculator, showing the housing, the keypad, the display, the integral distance sensor, the circuit board, the power source, the spirit levels, and the laser assembly.

In the embodiment illustrated in FIGS. 1-4, distance sensor 22 forms an integral part of calculator 10 and is rotatably mounted to housing 12 of calculator 10. This allows distance sensor 22 to rotate through a range of approximately 180 degrees or more to accommodate the needs of the user. In one exemplary embodiment, distance sensor 22 is mounted on a swivel head and can rotate in more than one direction. As illustrated in FIG. 4, sensor 22 is mounted within a casing 36 that includes two posts 38 that are adapted to rotatably slide within two apertures 39 formed by a front portion 40 and a back portion 42 of housing 12. Casing 36 includes a front section 44 and a back section 46. Casing 36 also includes an aperture 48 to accommodate sensor 22. Casing 36 forms a swivel head which can be rotated about posts 38, allowing a user to point distance sensor 22 at an angle while still viewing display 16. In another exemplary embodiment, integral distance sensor 22 may be mounted in a fixed position within housing 12.

In one exemplary embodiment, distance sensor 22 interfaces with a processor, such as a microprocessor forming a part of circuit board 18. Keypad 14 and display 16 also interface with circuit board 18, which allows measurements taken by distance sensor 22 to be incorporated into calculations made by project calculator 10. In one exemplary embodiment, the user may be presented with a variety of menus on display 16, and will be able to navigate through the menus using one or more keys on keypad 14. The menus may allow the user to change the unit of measure utilized in calculations involving the output of distance sensor 22. Measurement units may include feet, meters, inches, centimeters, and any other suitable unit of measure.

The user may also be able to calculate a multitude of standard building material quantities. Project calculator 10 may run software with the ability to calculate the needed quantity and other characteristics of the following building materials: block, board feet, brick, carpet, concrete, deck, fence, gravel, mulch, paint, roof bundles, stud, tile, wallpaper and 4'×8' sheet. The user will also be able to alter the system default values in the calculations for the various building materials, for example the paint coverage per gallon, thus allowing the user to adjust for differing material characteristics. This is achieved via the keypad 14 and using menus presented on display 16.

In one exemplary embodiment, calculator 10 provides helpful prompts to guide the user through the various operations and options available. Prompts may scroll on display 16 and indicate the input expected from the user.

Advantageously, project calculator 10 is easily upgradeable. That is, the software that is run by the processor integrated into circuit board 18 can be updated to expand or improve the functionality of project calculator 10 without adding to or changing the hardware. In one exemplary embodiment, the functionality of each key on keypad 14 can be changed or customized by a user.

As illustrated in FIGS. 1, 2, and 4, laser 24 is also mounted within casing 36, adjacent to distance sensor 22. Casing 36 includes a second aperture 50 to accommodate laser 24. Laser is mounted within casing 26 in such a way that the laser rotates along with distance sensor 22. Laser 24 provides a visual indicator to the user of where the distance sensor 22 is pointing, thus increasing accuracy of distance measurements taken by the user. In one exemplary embodiment, laser 24 is a solid-state laser. An alternate light source, such as a light emitting diode (LED) may also be used to provide a visual indicator for distance sensor 22.

As illustrated in FIGS. 1-3, spirit levels 26 are mounted within housing 12, and do not rotate with casing 36. Spirit levels 26 function to ensure that housing 12 of calculator 10 is level during measurement operations, thus increasing the accuracy and precision of any measurements taken by distance sensor 22. Spirit levels 26 can be of any suitable type, including electronic levels and filled-liquid type levels. As shown in FIG. 1, spirit levels 26 may comprises two separate leveling devices oriented along orthogonal axes to provide feedback with respect to two distinct axes.

Circuit board 18 can be populated with analog and/or digital, discrete components or be integrated in multi-chip modules or custom integrated chips including a microprocessor. Circuit board 18 can be composed of any substrate material. Circuit board 18 may include a plurality of interconnected printed circuit boards (PCBs). In the exemplary embodiment shown in FIG. 4, circuit board 18 consists of four separate circuit boards that work together to carry out the functions of calculator 10. In one exemplary embodiment, circuit board 18 includes a microprocessor and a memory or storage device. Programs including computer code with instructions to carry out the functions of calculator 10 are stored on the storage device, and the instructions are executed by the microprocessor. The microprocessor on circuit board 18 receives input from keypad 14 and sends output to display 16.

Power source 20 provides power to the components of calculator 10, including display 16, circuit board 18, integral distance sensor 22, and laser 24. In one exemplary embodiment, as illustrated in FIG. 4, power source 20 is a battery. Alternatively, power source 20 may include a solar panel or any other suitable power source. If a batteries are used, the batteries may be of the disposable or rechargeable type. Power source 20 may also include a plug module that plugs into a standard power outlet, a direct current (DC) adaptor, or an electrical generator.

To operate calculator 10, the user first presses an "ON" button located on keypad 14. A welcome message is then presented on display 16. The user then selects a mode of operation using keypad 14. In one exemplary embodiment, the modes of operation of calculator 10 include: 1) a Project Calculator Only Mode; 2) a Project Calculator with Integral Sensor Measurement Mode; and 3) a Measure only mode.

In Project Calculator Only Mode, calculator 10 functions as a project calculator, allowing a user to calculate the amount and costs of materials for various projects. Calculations that can be performed by calculator 10 in Project Calculator Only Mode include at least the following: standard calculations; material quantity requirement calculations; amount of coverage calculations, given a known quantity of material; and project cost calculations. In Project Calculator Only Mode, the user must enter the values for each of the parameters needed to perform the calculations.

In Project Calculator with Integral Sensor Measurement Mode, calculator 10 also functions as a project calculator that allows a user to perform standard project-related calculations, including: material quantity requirement calculations; amount of coverage calculations; and project cost calculations. However, in Project Calculator with Integral Sensor Measurement Mode, the user has the option of using a measured distance received from integral distance sensor 22 as one or more of the required parameters rather than entering a value for the parameter using keypad 14. In this mode, the user simply has to point integral distance sensor 22 at the object or surface that is to be measured and press the appropriate key on keypad 14 to actuate the measurement using integral distance sensor 22. The point to which the distance will be calculated is illuminated by laser 24. Calculation of the distance is undertaken by the digital electronics, in this case a microprocessor, located on circuit board 18, and the result is presented to the user via display 16. The user may then choose to either use this distance value in the final calculation or to perform the measurement again.

In Measure Only Mode, the user simply aims the integral distance sensor 22 at the desired object or surface with the help of the integrated laser 24, which illustrates where the distance sensor is being pointed to. The user then presses a measure button located on keypad 14. The distance from sensor 22 to the object being measured is calculated by the microelectronics on circuit board 18, and the result is presented to the user via display 16.

Regardless of the mode of operation, calculator 10 will automatically turn off after not receiving input for a predetermined time. The current calculation will be stored in a memory portion of circuit card 18, allowing a user to continue with the current calculation when the calculator is turned on at a later time.

The devices of the present invention, as described above and shown in the drawings, provide for an improved project calculator with an integral distance sensor. Additionally, the project calculator of the present invention may include a laser and one or more levels. It will be apparent to those skilled in the art that various modifications and variations can be made to the devices of the present invention without departing from the scope of the invention as set forth in the appended claims and their equivalents.

The optimum dimensional relationships for the parts of the project calculator, including variations in size, materials, shape, form, function and manner of operation, assembly and use, and all equivalent relationships to those illustrated in the drawings and described in the specification are intended to be encompassed by the present invention.

The invention claimed is:

1. A project calculator, comprising:
   a housing;
   a circuit board mounted within the housing and including a processor;
   a keypad connected to the circuit board and interfacing with the processor;
   a display device connected to the circuit board and interfacing with the processor;
   a casing rotatably mounted to the housing;
   a distance sensor mounted within the casing and interfacing with the processor; the distance sensor being configured to measure a distance from the sensor to an object;
   a laser assembly mounted within the casing and configured to provide a visual indicator on the object;
   a level indicator mounted to the housing; and
   a power source connected to the circuit board to provide power to components of the project calculator.

2. The project calculator of claim 1, wherein the display device is a liquid crystal display device.

3. The project calculator of claim 1, wherein the power source is a least one of a disposable battery, a rechargeable battery, a solar panel, and a power adapter.

4. The project calculator of claim 1, wherein the circuit board comprises a plurality of interconnected printed circuit boards.

5. The project calculator of claim 1, wherein the casing is rotatable in more than one direction.

6. A project calculator, comprising:
   a housing;
   a printed circuit board mounted within the housing and including a memory device and a processor;
   a keypad connected to the circuit board and interfacing with the processor;
   a display device connected to the circuit board and interfacing with the processor;
   a casing rotatably mounted to the housing;
   an acoustic proximity sensor mounted within the casing and interfacing with the processor, the acoustic proximity sensor being configured to measure a distance from the sensor to an object;
   a laser assembly mounted within the casing and configured to provide a visual indicator on the object;
   a plurality of level indicators mounted to the housing to provide an indication of whether the housing is level with respect to at least two different reference axes; and
   a power source connected to the circuit board and providing electrical power to project calculator;
   wherein the project calculator is configured to function in at least three modes, including a project calculator only mode, a project calculator with integral sensor measurement mode, and a measure only mode.

7. The project calculator of claim 6, wherein the project calculator is configured to incorporate the distance measured from the sensor to the object into a calculation when the project calculator is in project calculator with integral sensor measurement mode.

* * * * *